United States Patent Office 2,919,257
Patented Dec. 29, 1959

2,919,257

COMPOSITION OF MATTER COMPRISING A SULFUR DIOXIDE CONTAINING SOLUTION OF A POLYAMIDE

Norman Blake, Chaddsford, Pa., and William Spencer Shore, Grand Haven, Mich., assignors to E. I. du Pont de Nemours and Company, Wilmington, Del., a corporation of Delaware No Drawing. Application March 22, 1956
Serial No. 573,079

11 Claims. (Cl. 260—30.8)

This invention relates to a composition of matter. More particularly it is concerned with a liquid solution of a class of polymers as defined hereinafter.

It is an object of this invention to provide a novel composition of matter.

Another object is to provide a liquid polymer composition suitable for forming shaped articles.

These and other objects will become apparent in the course of the following specification and claims.

In accordance with the present invention a composition of matter is provided comprising a solution of a polymer of the formula

wherein —Y—, representing 50 molar percentage of the final polymers is a member of the class consisting of

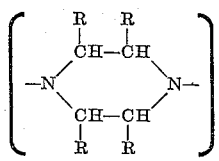

and mixtures thereof with up to 25 mol percent of

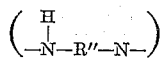

wherein R″— is a member of the class consisting of aliphatic and alicyclic hydrocarbons having at least two carbons with each amine group attached to a different carbon atom and wherein $n$ is a large number, —R is a member of the class consisting of hydrogen and lower alkyl, and —A— is a member of the class consisting of

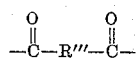

and

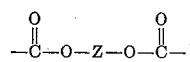

wherein —R‴— is any hydrocarbon containing at least 2 carbon atoms, each carbonyl being attached to a different carbon atom, —Z— being an aliphatic hydrocarbon radical containing 2 or more carbon atoms, each oxy bond being to different carbon atoms, with the proviso that where —A— is

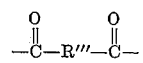

then at least one —R is lower alkyl, the liquid of the said solution being from the class consisting of liquid sulfur dioxide and a mixture of a liquid, containing sufficient sulfur dioxide to be substantially saturated with sulfur dioxide at room temperature and atmospheric pressure, having the formula

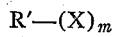

wherein —R′ is a saturated lower aliphatic compound containing no more than two carbon atoms, X is at least one halogen from the class consisting of —Cl, —Br and —F and $m$ is a whole number from 1 to 6.

The above solutions are useful in the preparation of shaped objects by extrusion, casting and the like, for instance as exemplified hereinafter.

The following examples are cited to illustrate the invention. They are not intended to limit it in any manner. Parts are by weight unless otherwise noted. Inherent viscosity values are measured in meta cresol at 25° C. Methods for producing the polymers employed herein as well as other members of the class of defined polymers are described in United States Patents Nos. 2,731,445, 2,731,446 and United States application Ser. No. 555,761, filed December 28, 1955.

Example I

Sulfur dioxide is liquefied by passing it into a pressure vessel cooled below its boiling point (10° C.). To 6 parts of liquefied sulfur dioxide, 1 part of the polyamide from dimethylpiperazine and terephthaloyl chloride having an inherent viscosity of 2.02 is added, and the pressure vessel sealed and warmed to room temperature. The vessel is rolled for two hours to assure complete dissolution of the polymer. At the end of this time the contents of the vessel are released through a fine orifice into the air. Fibers of this dimethylpiperazine polymer are produced. The inherent viscosity of the spun polymer is 1.86, indicating good molecular stability.

Example II 10 parts of chloroform are saturated with sulfur dioxide at 10° C. 1 part of the polyamide from dimethylpiperazine and terephthaloyl chloride having an inherent viscosity of 3.14 is found to be soluble in this solvent mixture whereas chloroform alone does not dissolve even a small amount.

Example III 79 parts of sulfur dioxide are liquefied as described in Example I and 21 parts of the polyurethane from piperazine and ethylene bis-chloroformate having an inherent viscosity of 2.24 are dissolved therein. A clear, tough, pliable, self-sustaining film of the polymer is cast.

Example IV

A mixture of 50 parts of sulfur dioxide and 50 parts of dichlorofluoromethane (boiling point about 9° C.) is cooled in a pressure vessel to liquefy the gas mixture and 15 parts of the polyamide prepared from dimethylpiperazine and terephthaloyl chloride and having an inherent viscosity of 3.14 are found to dissolve therein. A tough pliable film is cast and filaments are spun from a rod dipped into this solution at room temperature.

Example V

A mixture of about 40 parts of sulfur dioxide and 40 parts of dichlorodifluoromethane (boiling point of about —30° C.) is cooled to liquefy the mixture and 20 parts of the polyamide prepared from dimethylpiperazine and terephthaloyl chloride and having an inherent viscosity of 3.14, are dissolved therein. Filaments are drawn from the polymer solution and clear self-sustaining films of the polymer which are tough and pliable are cast at room temperature.

Example VI

A mixture of about 40 parts of sulfur dioxide and 40 parts of ethyl chloride (boiling point of about 12° C.) is cooled to liquefy the mixture and 21 parts of the polyurethane from piperazine and ethylene bis-chloroformate having an inherent viscosity of 2.24, are dissolved therein to form a clear solution. Tough pliable films are cast from this solution.

Example VII

A mixture of about 45 parts of sulfur dioxide and 45 parts of methyl chloride (boiling point of about —24° C.) is cooled to liquefy the mixture and 10 parts of the polyurethane from piperazine and bis-chloroformate of propane 2,2'-dimethyl 1,3 diol having an inherent viscosity of 1.67, are found to be soluble therein. The solution coats base sheet material such as paper, wood, cloth and the like, giving lustrous, smooth and adherent surfacings.

Example VIII

A number of solvent mixtures are prepared from chloroform, methylene chloride, bromochloromethane and trichloroethane by saturating at room temperature each of these liquid halogenated hydrocarbons with sulfur dioxide gas or by saturating at room temperature the liquid halogenated hydrocarbon with a gas mixture of sulfur dioxide and a gaseous halogenated hydrocarbon as shown in the following list:

Sulfur dioxide/chloroform
Sulfur dioxide/methylene chloride
Sulfur dioxide/bromochloromethane
Sulfur dioxide/trichloroethane
Sulfur dioxide/dichlorofluoromethane/chloroform
Sulfur dioxide/methyl chloride/chloroform
Sulfur dioxide/ethyl chloride/chloroform
Sulfur dioxide/dichlorodifluoromethane/chloroform
Sulfur dioxide/dichlorofluoromethane/methylene chloride
Sulfur dioxide/ethyl chloride/methylene chloride
Sulfur dioxide/dichlorodifluoromethane/methylene chloride
Sulfur dioxide/dichlorofluoromethane/trichloroethane
Sulfur dioxide/methyl chloride/trichloroethane
Sulfur dioxide/dichlorodifluoromethane/trichloroethane
Sulfur dioxide/dichlorofluoromethane/bromochloromethane
Sulfur dioxide/methyl chloride/bromochloromethane
Sulfur dioxide/dichlorodifluoromethane/bromochloromethane Each of these mixtures dissolves at room temperature to the extent of at least 10% each of the following fiber-forming polymers and copolymers: (1) polyamide from dimethylpiperazine and terephthalic acid, (2) polyamide from dimethylpiperazine and isophthalic acid, (3) from dimethylpiperazine and 4,4'-bibenzoic acid, (4) polyamide from dimethylpiperazine and hexahydroterephthalic acid, (5) polyamide from tetramethylpiperazine and terephthalic acid, (6) polyamide from methylpiperazine and phthalic acid, (7) polyamide from methylpiperazine and terephthalic/isophthalic acids (0.8/0.2), (8) polyurethane from piperazine and ethylene bis-chloroformate, (9) polyurethane from piperazine and hexamethylene bis-chloroformate, (10) polyurethane from dimethylpiperazine and the bis-chloroformate of propane 2,2'-dimethyl 1,3 diol, (11) copolymer from dimethylpiperazine and terephthalic acid and ethylene bis-chloroformate (1.0:0.75/0.25), (12) copolymer from dimethylpiperazine/bis(4 - aminocyclohexyl)methane and isophthalic acid (0.75/0.25:1.0), (13) copolymer from dimethylpiperazine/bis(4-aminocyclohexyl)methane and phthalic acid and isophthalic acid (0.75/0.25:0.6/0.4).

The high volatility of the solvent mixtures permits room temperature spinning, casting or coating of the solutions of this invention. Furthermore, at elevated temperatures such as 25 to 100° C. even higher concentrations of polymer may be dissolved. The solutions of this invention may be extruded through fine orifices by either the dry or wet spinning process to produce filaments and yarns or may be processed to form self-sustaining film or coatings on many types of surfaces.

As pointed out above, liquefied sulfur dioxide alone is useful as a solvent for the polymers defined within the present invention. Mixtures containing from as low as about 5% up to about 80% sulfur dioxide and one or more of such halogenated derivatives of methane and ethane as dichlorofluoromethane, chlorodifluoromethane, dichlorodifluoromethane, methyl chloride, methyl fluoride, ethyl chloride, ethylene difluoride, chlorotrifluoroethane, chloroform, methylene chloride, methylene fluoride, bromochloromethane, trichloroethane, fluoroform, trichlorofluoromethane, chlorotrifluoromethane, carbon tetrafluoride and carbon tetrachloride are also suitable. It is preferred that sufficient sulfur dioxide be present to permit the mixture to be saturated with sulfur dioxide at room temperature and under atmospheric conditions.

Many equivalent modifications will be apparent to those skilled in the art from a reading of the above without a departure from the inventive concept.

What is claimed is:

1. A composition of matter comprising a solution of a high molecular weight polymer having the recurring unit $$—Y—A—$$

wherein —Y—, representing 50 mole percent of the final polymer, is a member of the class consisting of

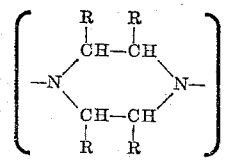

and mixtures thereof with up to 25 mol percent of

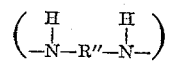

wherein R'' is a member of the class consisting of aliphatic and alicyclic hydrocarbons having at least two carbons with each amine group attached to a different carbon atom and wherein —R is a member of the class consisting of hydrogen and lower alkyl, and —A— is a member of the class consisting of

and

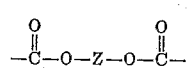

wherein —R'''— is any hydrocarbon containing at least 2 carbon atoms, each carbonyl being attached to a different carbon atom, —Z— being an aliphatic hydrocarbon radical containing 2 or more carbon atoms, each oxy bond being to different carbon atoms, with the proviso that where —A— is

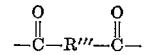

then at least one —R is lower alkyl, the liquid of the said solution being selected from the class consisting of sulfur dioxide under pressure and a mixture of a liquid containing sufficient sulfur dioxide to be substantially saturated with sulfur dioxide at room temperature and atmospheric pressure, having the formula $$R'—(X)_m$$

wherein —R' is lower alkyl containing no more than 2 carbon atoms, X is at least one halogen from the class consisting of —Cl, —Br, and —F and $m$ is a whole number from 1 to 6.

2. A composition of matter comprising a solution as defined in claim 1, wherein the liquid of the said solution is liquid sulfur dioxide.

3. A composition of matter comprising a solution as defined in claim 1, wherein the liquid of the said solution comprises a halogen substituted liquid as defined in claim 1 substantially saturated with sulfur dioxide at room temperature and atmospheric pressure.

4. The composition of claim 2 wherein the polymer is polydimethylpiperazineterephthalamide.

5. The composition of claim 2 wherein the polymer is polyethylene-1,4-piperazinedicarboxylate.

6. A composition of matter as defined in claim 3 wherein the halogen substituted liquid is chloroform.

7. A composition of matter as defined in claim 6 wherein the polymer is polydimethylpiperazineterephthalamide.

8. A composition of matter as defined in claim 3 wherein the halogen substituted liquid is dichlorofluoromethane.

9. A composition of matter as defined in claim 8 wherein the polymer is polydimethylpiperazineterephthalamide.

10. A composition of matter as defined in claim 3 wherein the halogen substituted liquid is ethylchloride.

11. A composition of matter as defined in claim 10 wherein the polymer is polyethylene-1,4-piperazinedicarboxylate.

References Cited in the file of this patent
UNITED STATES PATENTS 2,731,445    Wittbecker _____ Jan. 17, 1956

UNITED STATES PATENT OFFICE

Certificate of Correction

Patent No. 2,919,257                                                          December 29, 1959

Norman Blake et al.

It is hereby certified that error appears in the printed specification of the above numbered patent requiring correction and that the said Letters Patent should read as corrected below.

Column 1, lines 38 to 40, the formula should appear as shown below instead of as in the patent:

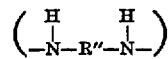

column 3, line 47, after "(3)" insert —polyamide—.

Signed and sealed this 21st day of June 1960.

[SEAL]

Attest:
KARL H. AXLINE,
*Attesting Officer.*

ROBERT C. WATSON,
*Commissioner of Patents.*